United States Patent
Kitajima

(10) Patent No.: US 7,692,715 B2
(45) Date of Patent: Apr. 6, 2010

(54) DIGITAL CAMERA

(75) Inventor: Tatsutoshi Kitajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1167 days.

(21) Appl. No.: 10/796,022

(22) Filed: Mar. 10, 2004

(65) Prior Publication Data

US 2004/0239795 A1 Dec. 2, 2004

(30) Foreign Application Priority Data

Mar. 20, 2003 (JP) .............................. 2003-077425

(51) Int. Cl.
*H04N 5/235* (2006.01)
(52) U.S. Cl. .................... 348/362; 348/221.1
(58) Field of Classification Search ............ 348/208.99, 348/364, 221.1
See application file for complete search history.

(56) References Cited

U.S. PATENT DOCUMENTS

| | | | |
|---|---|---|---|
| 5,109,249 A | | 4/1992 | Kitajima |
| 5,172,233 A | * | 12/1992 | Yoshihara et al. ........ 348/208.1 |
| 5,229,805 A | | 7/1993 | Kitajima |
| 5,414,486 A | * | 5/1995 | Goto et al. .................... 396/52 |
| 5,524,162 A | * | 6/1996 | Levien ........................ 382/263 |
| 5,682,563 A | | 10/1997 | Shinohara et al. |
| 5,708,863 A | * | 1/1998 | Satoh et al. ................... 396/52 |
| 5,713,049 A | * | 1/1998 | Ohishi et al. ................... 396/55 |
| 5,748,233 A | | 5/1998 | Kitajima et al. |
| 5,808,681 A | | 9/1998 | Kitajima |
| 5,937,100 A | | 8/1999 | Kitajima |
| 6,075,562 A | | 6/2000 | Sakaguchi et al. |
| 7,030,911 B1 | * | 4/2006 | Kubo ....................... 348/221.1 |
| 7,176,962 B2 | * | 2/2007 | Ejima ...................... 348/208.4 |
| 2004/0090532 A1 | * | 5/2004 | Imada .................... 348/208.16 |

FOREIGN PATENT DOCUMENTS

| | | |
|---|---|---|
| JP | 3063801 | 7/2000 |
| JP | 2001-103366 | 4/2001 |

OTHER PUBLICATIONS

U.S. Appl. No. 09/879,041, filed Jun. 13, 2001, Kitajima et al.
U.S. Appl. No. 10/087,955, filed Mar. 5, 2002, Kitajima.
U.S. Appl. No. 10/230,162, filed Aug. 29, 2002, Kitajima et al.
U.S. Appl. No. 10/796,022, filed Mar. 10, 2004, Kitajima.

* cited by examiner

*Primary Examiner*—Luong T Nguyen
(74) *Attorney, Agent, or Firm*—Oblon, Spivak, McClelland, Maier & Neustadt, L.L.P.

(57) ABSTRACT

A digital camera according to the present invention includes a device to set up a plurality of exposure conditions, a device to obtain a plurality of imaging data imaged in accordance with the plurality of exposure conditions set by the plurality exposure conditions set up device, and a device to compare a sharpness based on the plurality of imaging data obtained by the plurality of imaging data obtaining device, and a shake of the camera or a blur of a subject is determined corresponding to the comparison result of the sharpness comparison device.

13 Claims, 10 Drawing Sheets

| SHARPNESS COMPARISON 1 | SHARPNESS COMPARISON 2 | BLUR DETERMINATION |
|---|---|---|
| An = Bn | - | NON-BLUR |
| An > Bn | - | NON-BLUR |
| An < Bn | Bn = Bn + 1 | CAMERA SHAKE |
| An < Bn | Bn ≠ Bn + 1 | SUBJECT BLUR |

| DIFFERENCE OF An AND An+1 | DIFFERENCE OF Bn AND Bn+1 | BLUR DETERMINATION |
|---|---|---|
| SMALL | - | NON-BLUR |
| LARGE | SMALL | CAMERA SHAKE |
| LARGE | LARGE | SUBJECT BLUR |

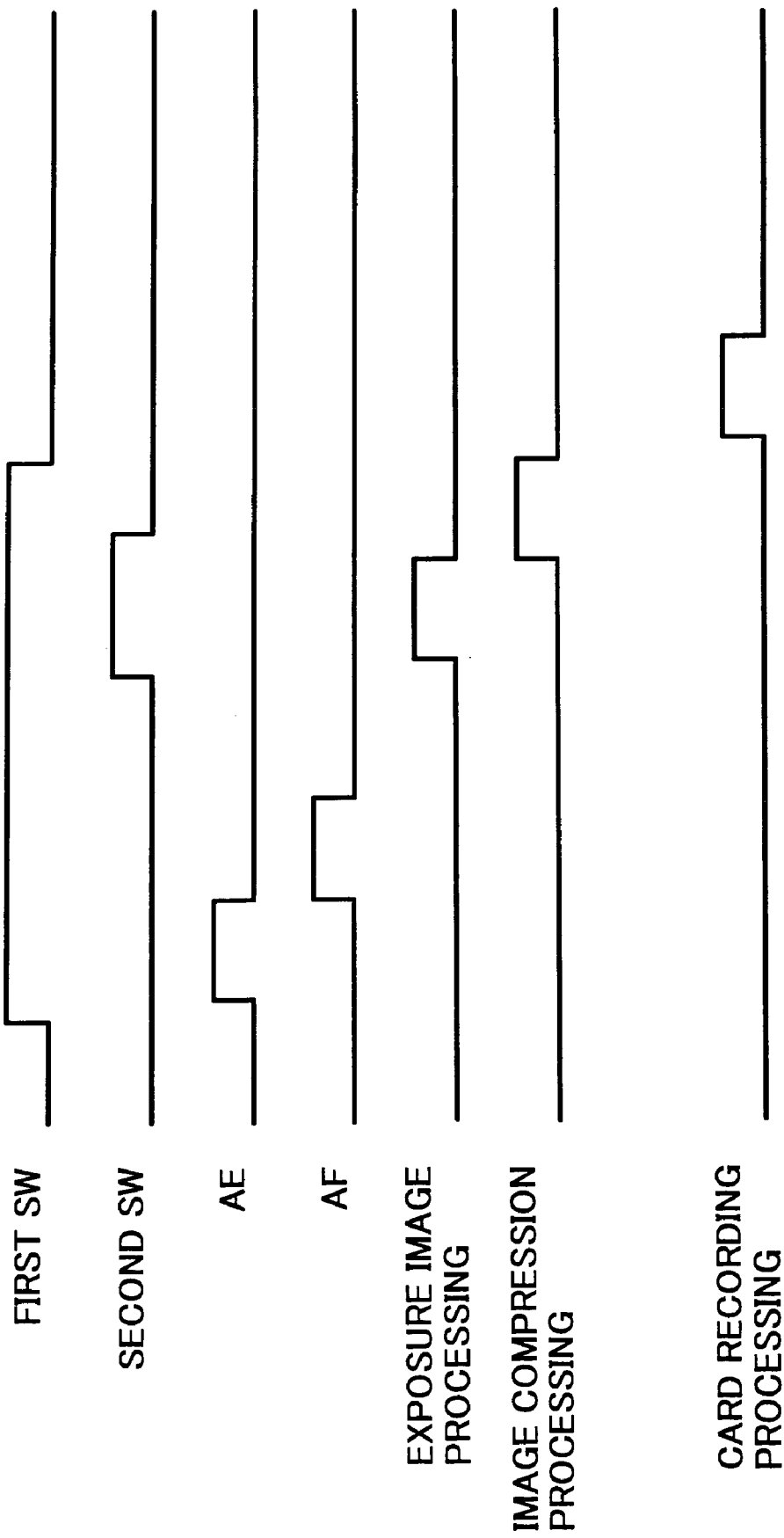

FIG. 6A

| SHARPNESS COMPARISON 1 | SHARPNESS COMPARISON 2 | BLUR DETERMINATION |
|---|---|---|
| An = Bn | - | NON-BLUR |
| An > Bn | - | NON-BLUR |
| An < Bn | Bn = Bn + 1 | CAMERA SHAKE |
| An < Bn | Bn ≠ Bn + 1 | SUBJECT BLUR |

FIG. 6B

| DIFFERENCE OF An AND An+1 | DIFFERENCE OF Bn AND Bn+1 | BLUR DETERMINATION |
|---|---|---|
| SMALL | - | NON-BLUR |
| LARGE | SMALL | CAMERA SHAKE |
| LARGE | LARGE | SUBJECT BLUR |

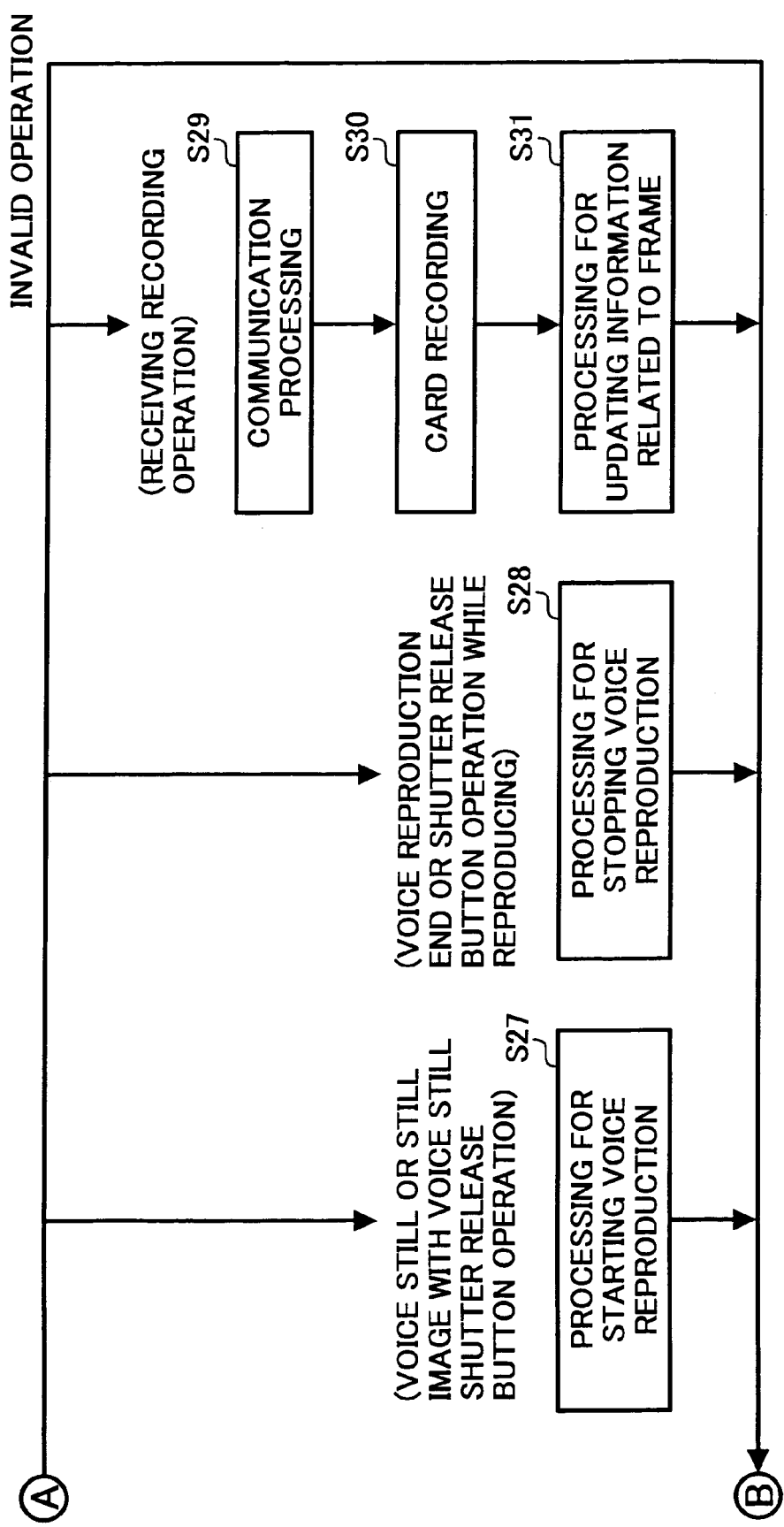

DIGITAL CAMERA

BACKGROUND OF THE INVENTION

1. Field of the Invention

The present invention relates to a digital camera corresponding a blur, and more particularly to a digital camera corresponding the blur that is capable of determining an exposure condition in response to respective causes such as a shake of the camera and a blur of a subject without using a sensor for detecting the blur.

2. Description of the Prior Art

There has been increased in a recent digital camera having a large magnification of a photographic lens. With this large magnification, there have been seen many blurred photographic images by handshake. As means for preventing the blurred photographic image by such handshake, the following various means have been proposed.

As means for detecting a camera shake, there has been proposed means for detecting a blur amount of the camera by installing an angular speed detecting sensor in the camera (see JP0357752, Page 2 in the specification, FIG. 2)

Moreover, there has been proposed means for protecting the blur by changing an exposure condition with speed for depressing a shutter release button (JP03063801, FIG. 1).

Furthermore, there has been proposed means for changing an exposure condition by detecting the motion of the photographed subject from two images obtained by the twice exposure (see Japanese Patent Laid-Open 2001-103366, FIG. 1).

However, the invention disclosed in JP0357752 requires another sensor, so that a cost is increased. The invention disclosed in JP03063801 adopts the means for depressing a shutter release bottom as an alternative characteristic of blur, so that it is hard to say that the blur is precisely detected.

When the shake of camera or a blur of a subject is detected, it is preferable to adjust an exposure condition corresponding to respective causes; however, the invention disclosed in Japanese Patent-Laid Open 2001-103366 treats the camera shake and the subject blur as the same blur, and can not distinguish the camera shake and the subject blur.

SUMMARY OF THE INVENTION

The present invention addresses these problems, with an object of providing a camera corresponding blur that is capable of determining an exposure condition in response to respective causes such as a shake of the camera and a blur of a subject without using a sensor for detecting blur.

In order to achieve the above object, a digital camera having an image forming device to image a subject by an setup exposure condition and a digital image processing device to convert an imaging data from the image forming device into a digital image comprises a device to setup a plurality of exposure conditions, a device to obtain a plurality of imaging data imaged in accordance with the plurality of exposure conditions set by the plurality exposure conditions setup device, and a device to compare a sharpness based on the plurality of imaging data obtained by the plurality of imaging data obtaining device, and determines a camera shake or a subject blur corresponding to the comparison result of the sharpness comparison device.

The type of blur such as the camera shake or the subject blur is accordingly determined, so that the most suitable exposure condition can be set in accordance with the camera shake or the subject blur while capturing a still image.

The digital camera further comprises a device to output an exposure time for preventing a handshake based on a focal length of a photographic lens in the image forming device, and may determine the existence of the camera shake based on the handshake preventing exposure time output by the handshake preventing time output device.

Therefore, only when the handshake is existed, picture-taking can be conducted in the preventing exposure time output by the handshake preventing exposure time output device, so that the handshake prevented still image can be captured.

Furthermore, when the camera shake is existed, it is possible to configure the digital camera, which comprises a device to warn of the camera shake.

A user (photographer) who receives the warning accordingly pays attention to the camera shake (handshake), so the possibility of the camera shake is decreased.

When the camera shake is existed, a predetermined exposure time while functioning the still image recording is shortened, and when the exposure is not enough, it is possible to configure the digital camera to flash a strobe.

Consequently, only when the handshake is existed, the exposure time is shortened, and when the exposure is not enough, the strobe is flashed, enabling to capture the still image without handshake.

Meanwhile, when the subject blur is existed, sensitiveness for increasing the output of the imaging data while functioning the still image recording may be increased.

When capturing a moving image with the subject blur, the sensitiveness is increased, so that the still image without blur can be captured.

The digital camera further comprises a device to display an image processed by the digital image processing device, and display time to the display device may be made constant regardless of the exposure time in the image forming device.

Even when the photography with different exposure time is carried out, the display time to the display device is constant, so that image display can be smoothly performed.

BRIEF DESCRIPTION OF THE DRAWINGS

FIG. 4 is a timing chart while recording a still image in the embodiment.

FIG. 6A is a view illustrating sharpness in an exposure period;

FIG. 6B is a view illustrating the difference of the exposure time in a screen for adjacent periods.

FIGS. 7A, 7B is a flow chart illustrating the main processing while reproducing in the embodiment.

DETAILED DESCRIPTION OF THE PREFERRED EMBODIMENT

Hereinafter, an embodiment of the present invention will be described with reference to the drawings.

Figure 1:
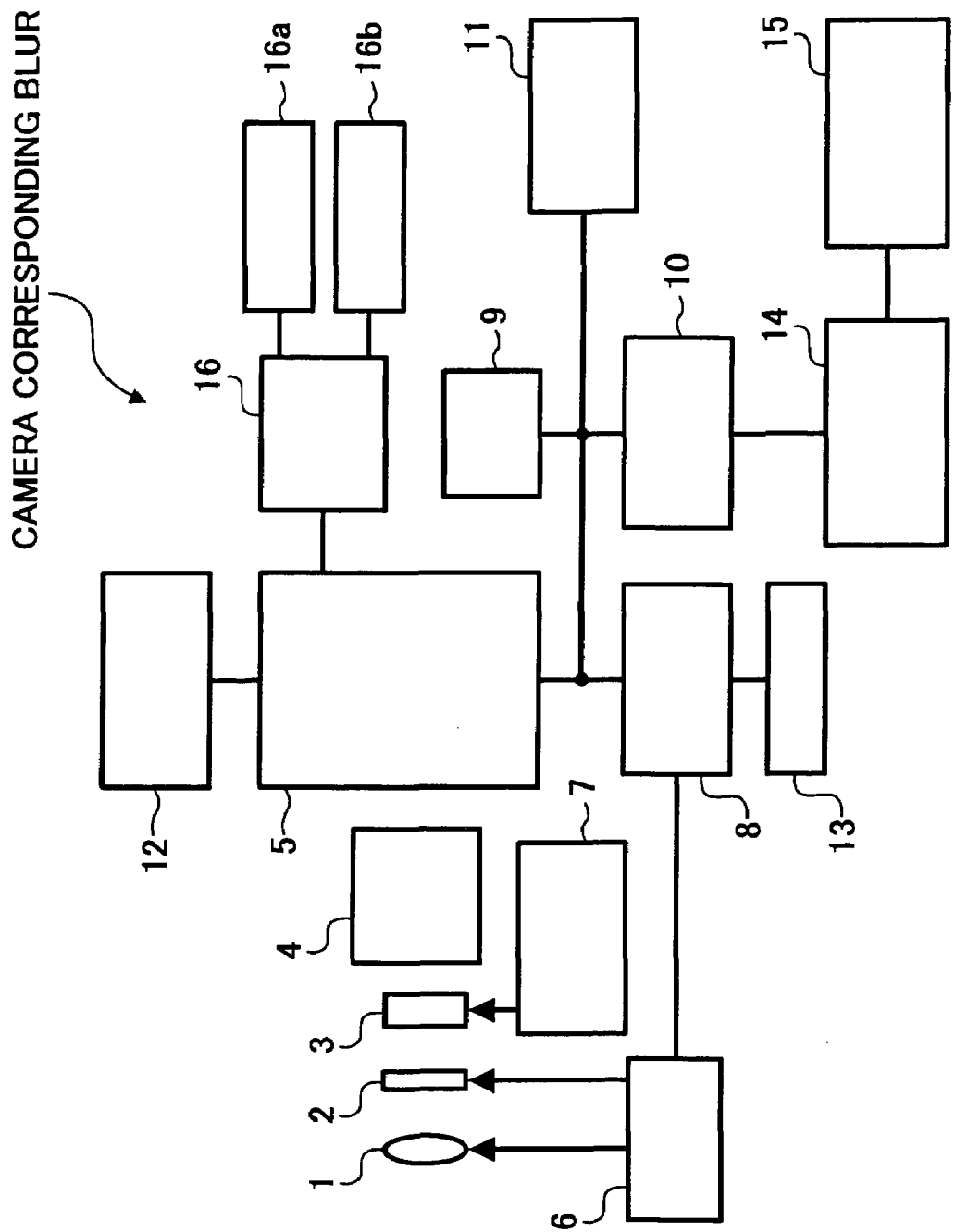
FIG. 1 is a block diagram illustrating a camera corresponding blur of a digital camera to which an embodiment of the present invention is applied.
Figure 2A:
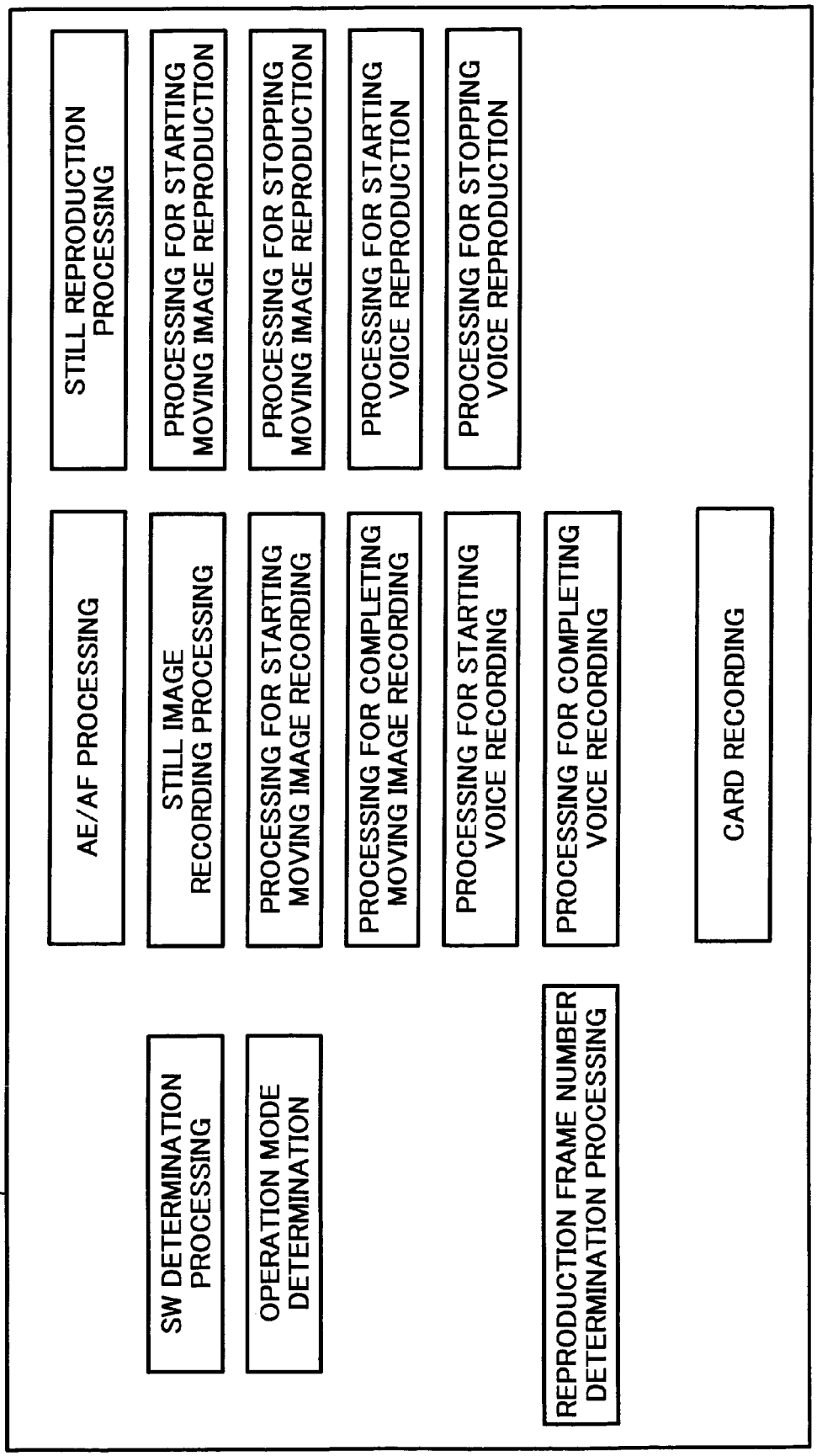
FIGS. 2A, 2B is a diagram illustrating programs together used in an embodiment of the present invention.
Figure 2B:
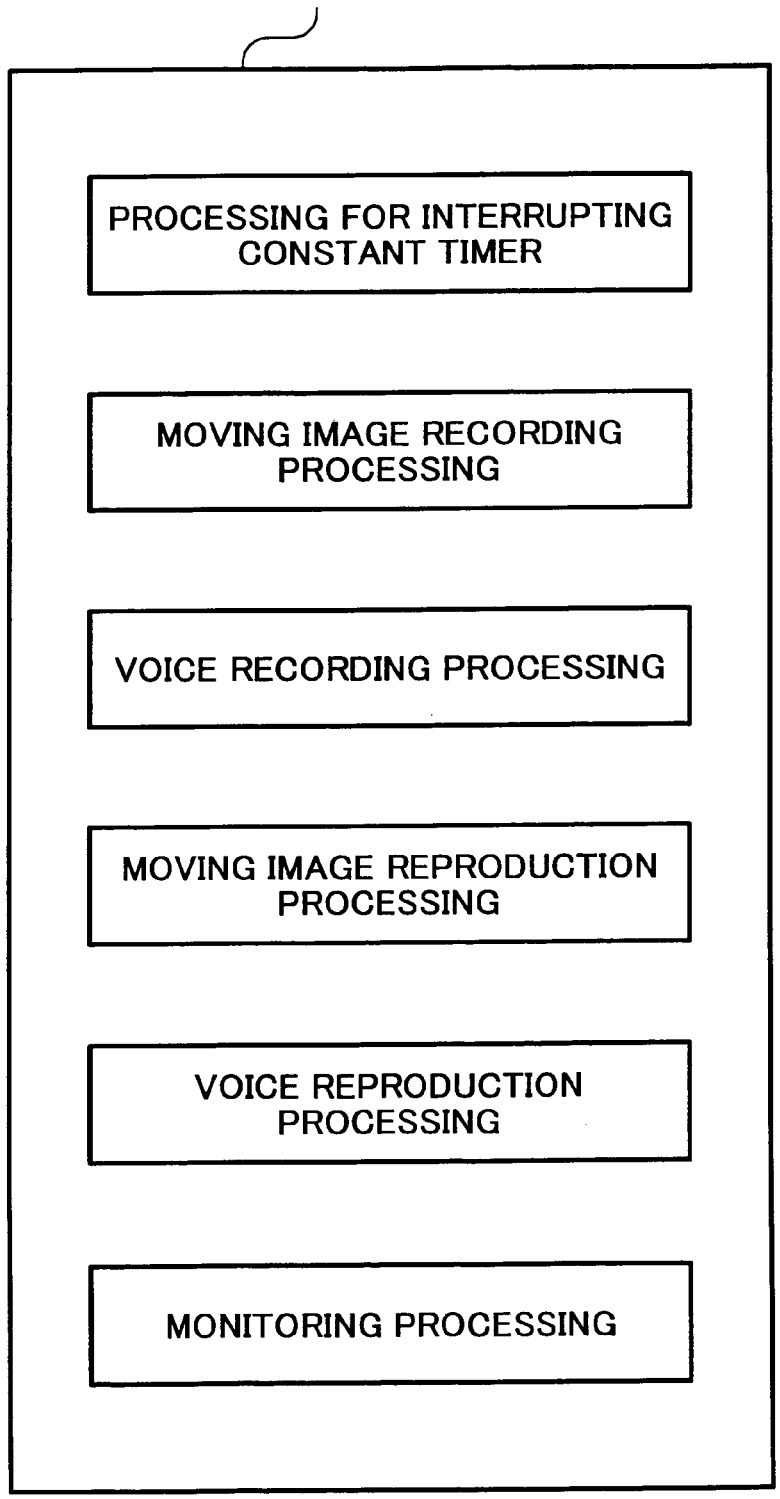
Figure 3A:
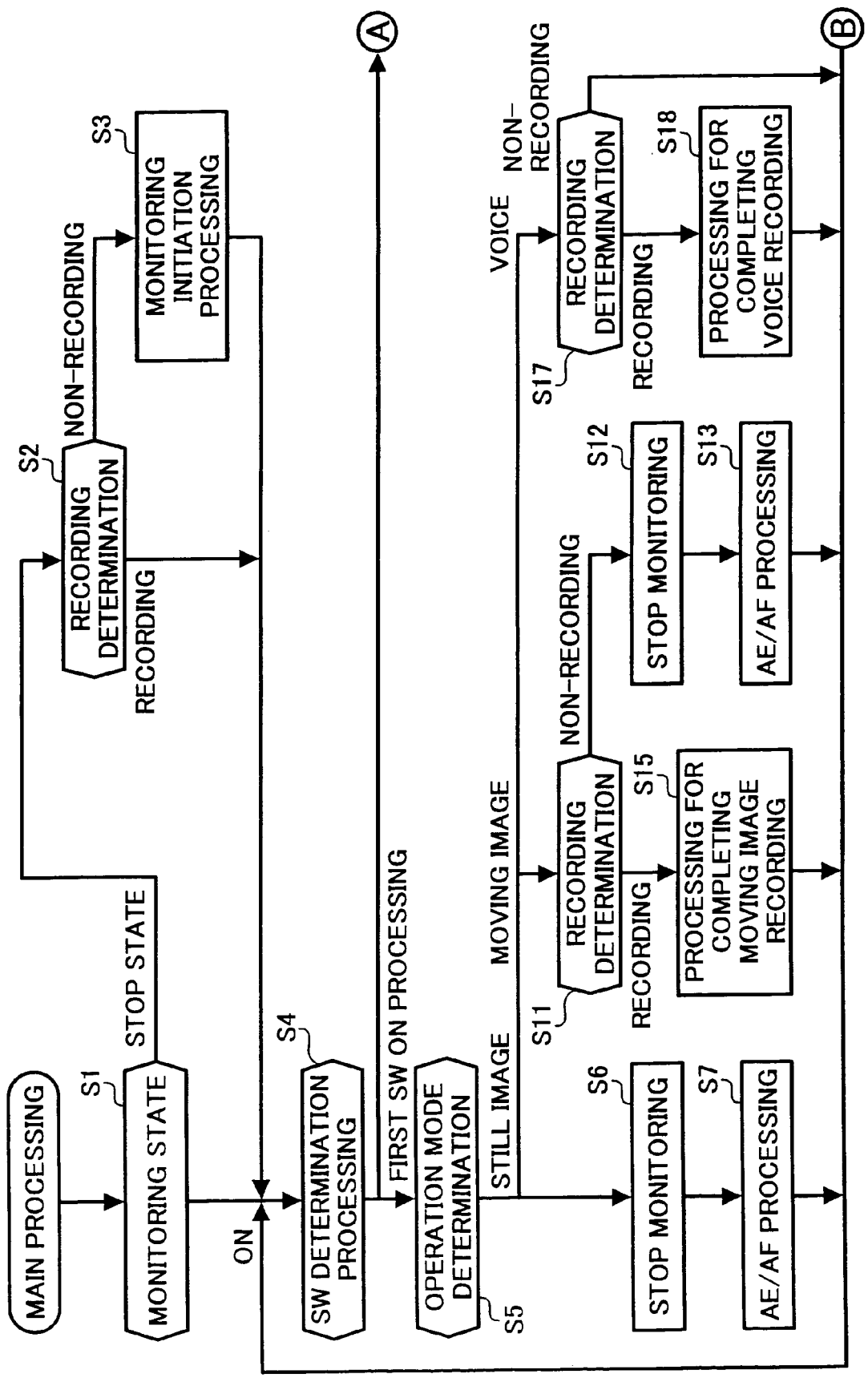
FIGS. 3A, 3B is a flow chart illustrating the main processing while recording in the embodiment.
Figure 3B:
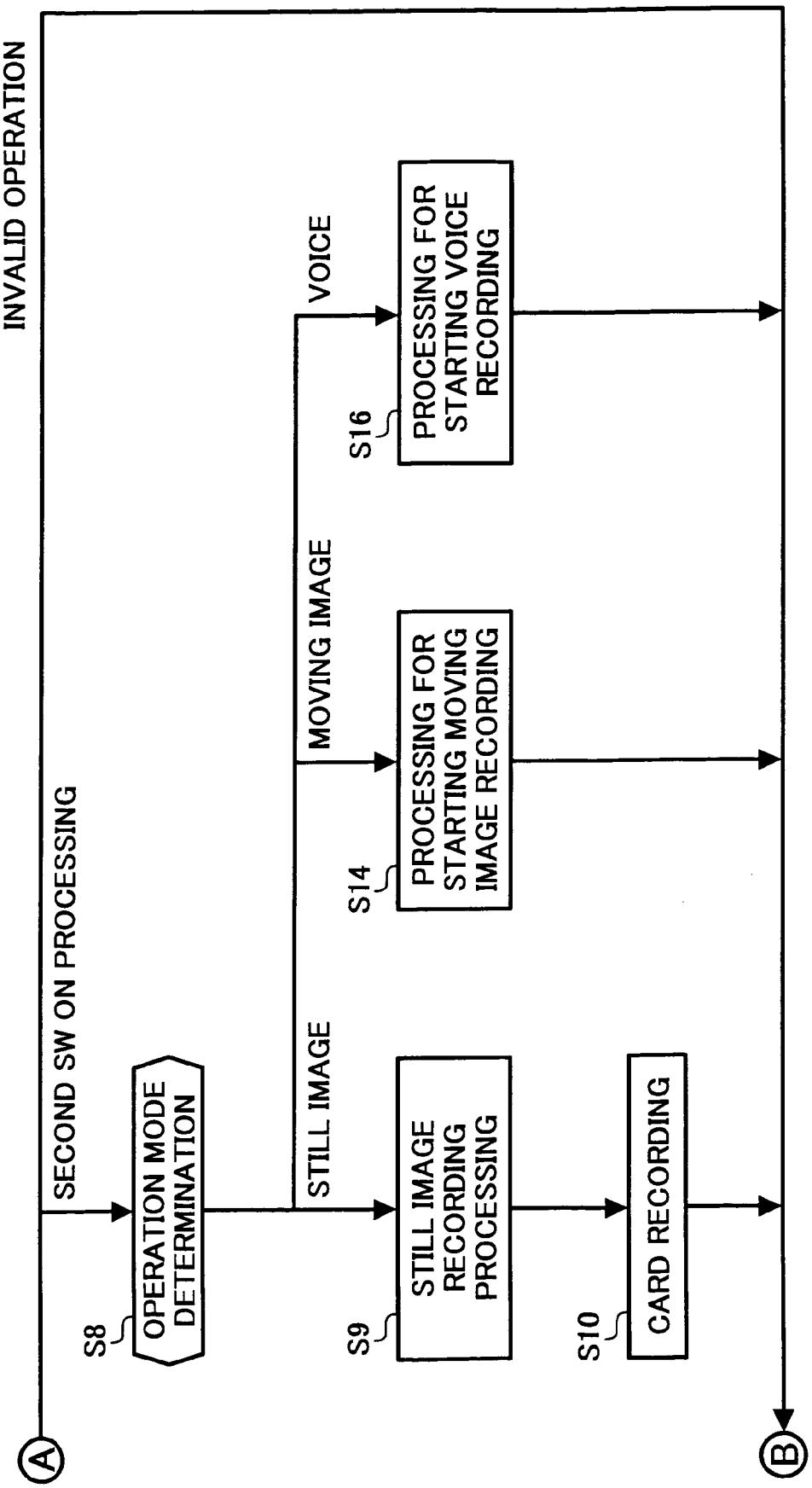

FIG. 1 is a block diagram illustrating a camera BC corresponding blur of a digital camera to which an embodiment is applied; FIG. 2 is a diagram illustrating programs together used in the embodiment of the present invention; and FIG. 3 is a flow chart illustrating a processing in the embodiment.

(1) Explanation of the Block Diagram

First of all, a block configuration of a camera BC corresponding blur in which an embodiment is applied will be explained based on FIG. 1.

In FIG. 1, reference numeral 1 denotes a lens, reference numeral 2 a mechanical shutter, reference numeral 3 a CCD, reference numeral 4 a CDA•AD portion for conducting correlated double sampling and A/D conversion of a CCD signal, and reference numeral 5 a DSP portion for carrying out a digital signal processing which converts the converted digital signal into luminance Y, color difference U, and V signal, then compresses the YUV data by the JEPG. A driver portion 6 drives a mechanical portion, and performs focusing for driving the lens 1 and the open and close operation of the mechanical shutter 2.

Reference numeral 7 denotes a CCD driving circuit portion and reference numeral 8 a CPU portion for controlling the entire camera. A memory 9 temporary stores photographed image data and read data from a file and the memory 9 is used as a work memory for the DSP portion 5 and the CPU portion 8.

Reference numeral 10 is a communication driver portion for communicating with the external of the camera BC corresponding blur, reference numeral 11 a memory card detachable to the camera, reference numeral 12 a display portion comprising a display controller for converting the image output signal from the DSP portion 5 into a signal capable of being displayed on a LCD and a LCD for actually displaying the image, and reference numeral 13 a switch (SW) portion capable of being operated by a camera user.

Reference numeral 14 is a first external device, which is connected to a camera, and if the first external device 14 includes a display device, the display portion 12 of the camera body can be omitted. The first external device 14 incorporates a charging circuit for charging a battery in the camera body, for example.

Reference numeral 15 denotes a second external device, which can be connected to the first external device 14, for example, a personal computer and the like.

A voice CODEC 16 converts the signal from an input analogue portion 16a into a digital signal, and sends it to the DSP 5. The voice CODEC 16 also converts the digital voice data received from the DSP portion 5 into analogue data, then outputs to an output analogue portion 16b.

(2) Configuration of Program

As illustrated in FIG. 2, a program used in the embodiment comprises a main processing block 20 and a parallel processing block 30.

The details of each processing in the main processing block 20 and the parallel processing block 30 will be described in each processing after FIG. 3.

(3) Explanation of Main Processing While Recording

FIG. 3 is a flow chart of main processing while recording, enabling to record a still image, a moving image, and voice as the main processing.

Before the main processing while recording, if a camera power source (not shown in FIG. 1) is turned on by recording mode, recording preparation processing such as initializing hardware inside a camera and creating file information inside a card in the memory 9 are carried out. After that the main processing for recording is started.

In the main processing, a monitoring condition is checked (step S1), with the condition that the monitoring is stopped, when the recording is not carried out (step S2: non-recording), a monitoring initiation processing is conducted (step S3). When the recording is carried out (step S2: recording), the processing transits to step S4.

At this point, the monitoring processing performs tracking processing such as AE (automatic exposure) and AWB (automatic white balance) when a live image of a camera is displayed, and with the monitoring processing, the image having an appropriate brightness and natural color displayed on the display portion 12 of the camera can be maintained.

In particular, the image processing of the data in the imaging portion such as the lens 1 and the CCD 3 is conducted in the digital image processing portion (DSP portion 5), the evaluated values with respect to each AE and AWB are obtained in the CPU portion 8, and an exposure time is set to the CCD driving circuit portion 7, and feedback control for adjusting the parameter of image processing color in the DSP portion 5 is conducted, in order for the evaluated values to be a predetermined value.

A SW determination processing (step S4) decides SW information which is input by a processing for interrupting a constant timer for each 20 ms, and sends the information to an operation mode determination portion (step S5).

The operation mode determination (step S5) sorts tasks into each processing block such as an AE/AF (automatic focusing) processing, a processing for recording a still image, a processing for starting moving image recording, a processing for completing moving image recording, a processing for starting voice recording, and a processing for completing voice recording while taking a picture.

(3-1) Still Image Recording Processing

The still image recording processing goes through operations till an image is stored in the memory card 11. The operations are described based on FIGS. 1 and 3.

When capturing a still image, if a first switch of a shutter release button (hereinafter referred to SW), which is provided in the switching portion 13 and is not shown in the drawings, is turned on, the AE/AF processing are carried out.

In accordance with the result of the AE/AF processing, the CPU portion 8 drives the lens 1 by the driving portion 6, and brings to focus.

The imaging data are evaluated by the DSP portion 5, determining the exposure time value of the CCD 3, which is set in the CCD driving circuit portion 7.

In FIG. 3, if a first SW on processing is determined in the SW determination processing (step S4), and a still image is determined in the operation mode determination (step S5), the monitoring is stopped (step S6). After the AE/AF processing is completed (step S7), the processing returns to the SW determination processing (step S4) again, and if effective SW information is not included, a loop returning to the SW determination processing (step S4) is repeated.

In the SW determination processing (step S4), if the switches up to the second SW are turned on, a still image is determined by the operation mode determination (step S8), carrying out the still image recording processing (step S9).

The image processing and the compression are conducted to the CCD imaging data (still image) in the DSP portion 5, and then the imaging data are written into the memory 9.

When the image compression data are stored in the memory 9, the CPU portion 8 writes the image compression data into the memory card 11 (step S10).

That is, in the SW determination processing (step S4), for a still image, if the second SW is turned on with the on state of the first switch, the second SW on processing is determined, performing the still image recording processing. The still image is written into the memories up to the memory card 11.

FIG. 4 illustrates a timing chart of still image recording.

(3-2) Moving Image Recording Processing and Voice Recording Processing

In FIG. 3, the processing of the parallel processing block 30, which operates with the main processing block 20 (FIG. 2) is conducted for the moving image recording or the voice recording. In other words, the main processing block 20 controls the beginning and the end with respect to the moving image recording processing and the voice recording processing of the parallel processing block 30.

When the recording begins, the recording processing of the parallel processing block 30 is activated from the main processing block 20. When the recording operation is started, the main processing block 20 repeats the loop of the SW determination processing (step S4).

When the recording stops, the main processing block 20 indicates the end of the recording processing of the parallel processing block 30, and wait for receiving the completion information of the end from the parallel processing block.

(3-2-1) Explanation of Moving Image Recording

Moving image recording will be described with reference to FIG. 1.

The processing till the first SW is the same as the still image; when the second SW is turned on, the DSP 5 compresses, for example 15 images per second, writing the compressed images into the memory 9.

In addition to the writing into the memory 9, the input data from an input analogue portion 16a including a microphone is converted into digital data, so the digital data is also written into the memory 9.

The CPU portion 8 writes, for example, one package of the moving image and the voice data in the memory 9 for one second into the memory card 11.

In addition to the writing, the DSP portion 5 writes the moving image and the voice for next one second into another area of the memory 9.

When the first SW is again turned on while recording the moving image, the above moving image recording is stopped, and the CPU portion 8 writes the data in the memory 9 into the memory card 11 as well as registers the written moving image and voice data in the file management information area of the memory card 11 as a file, then completes the moving image file recording.

The moving image recording processing will be described based on FIG. 3.

When the first SW is turned on, the first SW on processing is determined in the SW determination processing. Moreover, the moving image mode is determined in the operation mode determination (Step S5), and the first SW on processing of the moving image is carried out.

In this case, the moving image is not recorded (step S11: non-recording); stopping the monitoring (step S12), and performing the AE/AF processing (step S13). After that the processing returns to the SW determination processing (step S4); repeating the loop which returns to the SW determination processing until effective SW information is determined.

If the second SW is turned on with the on state of the first SW, the second SW on processing of the moving image is determined in the SW determination processing (step S4). The processing for starting moving image recording is thereby carried out (step S14).

The main processing returns to the SW determination processing (step S4), but the moving image recording processing of the parallel processing block is collaterally carried out, continuing the recording state.

Moreover, as long as the first SW and the second SW are turned off, the switches are not determined as effective information in the SW determination processing (step S4).

After turning off the first SW and the second SW once, if the first SW is turned on again, the first SW ON processing of the moving image mode is conducted.

However, in this case the processing is in the recording state, so that the processing for completing moving image recording is carried out.

(3-2-2) Explanation of Voice Recording

The explanation of voice recording will be given based on FIG. 1.

For the voice recording, if the second SW is turned on, the input data from the input analogue portion 16a including the microphone are converted into digital data by the voice CODEC 16, so that the DSP portion 5 writes the data into the memory 9. The CPU portion 8 sequentially writes the data into the memory card 11.

While recording the voice, if the first SW is again tuned on, the processing is stopped, and the CPU portion 8 registers the written voice data into the file management information area of the memory card 11 as a file, and then completes the voice file recording.

The voice recording processing will be explained based on FIG. 3.

When the second SW is turned on, the second SW ON processing is determined in the SW determination processing (step S4). Moreover, the voice mode is determined in the operation mode determination (step S8), and the processing for starting voice recording which is the second SW ON processing of the voice is carried out (step S16).

The main processing returns to the SW determination processing (step S4), but the voice recording processing of the parallel processing block 30 in FIG. 2 is collaterally carried out, continuing the recording state.

Additionally, as long as the first SW and the second SW are turned off, the switches are not determined as effective SW information in the SW determination processing.

After turning off the first SW and the second SW once, if the first SW is again turned on, the first SW ON processing of the voice mode is carried out. However, in this case, the processing is in the recording state (step S17: recording), so that the processing for completing voice recording (step S18) is performed.

(4) Explanation of Monitoring

Figure 5:
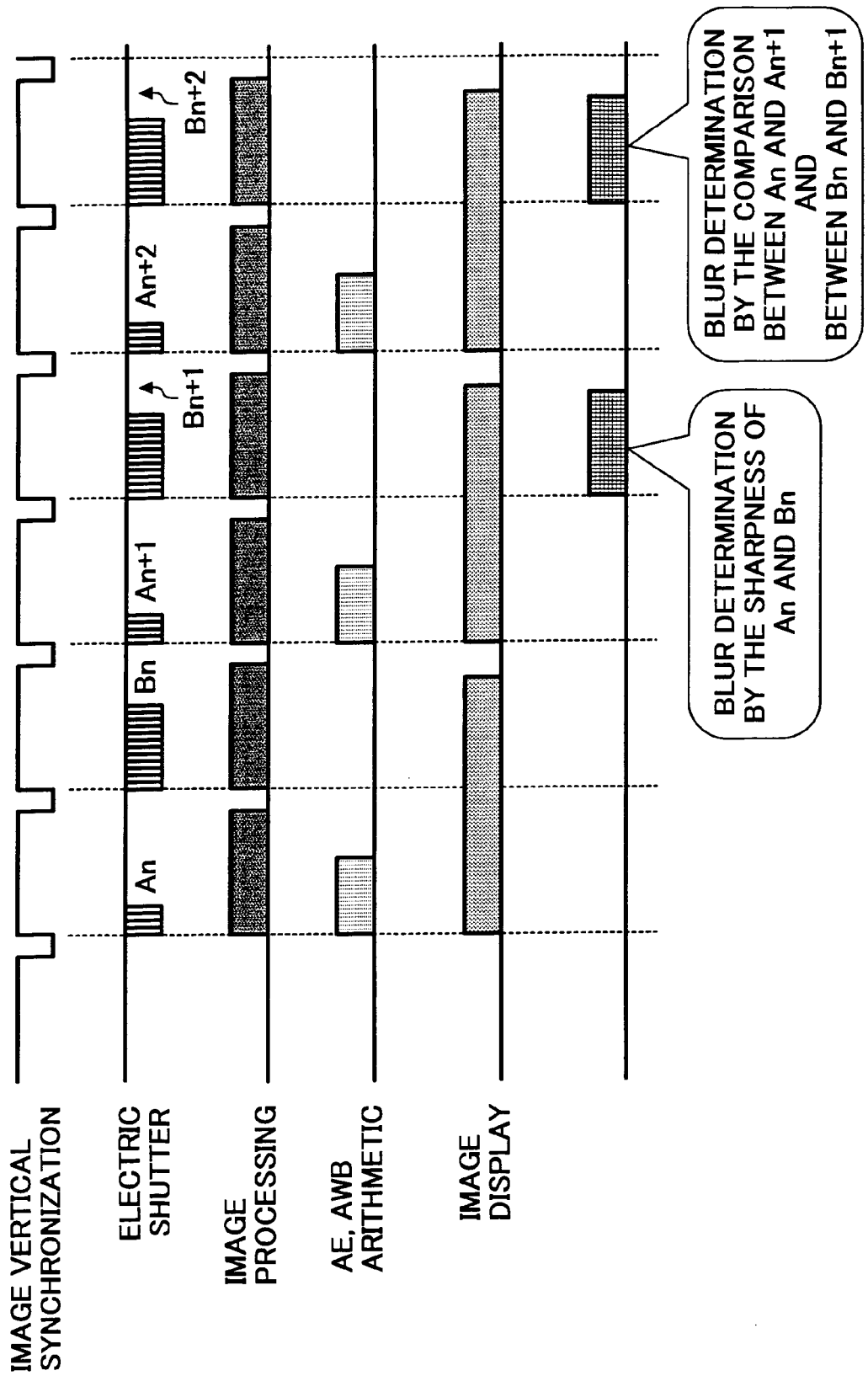
FIG. 5 is a timing chart during monitoring.

FIG. 5 is a timing chart while monitoring. Image vertical synchronization is a synchronizing signal that the CCD 3 of the photographic portion outputs one image, and the image processing is carried out by synchronizing to this synchronizing signal.

An electronic shutter controls the exposure time of the CCD 3, and the portion with the vertical lines is the period for discharging electric charge, and the portion without vertical lines is the exposure period.

The exposure periods A, B are shown in FIG. 5; A is the exposure time that the AE is controlled in accordance with the brightness of the subject, and B is the exposure time shorter than A.

For the image of the exposure period A, the image processing is carried out at the next synchronous period; furthermore, the AE and AWE are calculated after the synchronous period.

The results are reflected to the AE and AWB control amount of the A series exposure period.

The processed image is displayed on the display portion 12.

(5) Blur Determination Method

FIGS. 6A and 6B illustrate examples of blur determination methods. FIG. 6A illustrates sharpness of an exposures period; FIG. 6B illustrates the difference of the exposure time in a screen for adjacent exposure times.

The exposure periods An, Bn in FIG. 6A are evaluated values illustrating the sharpness of n synchronous period, for example, it is the value that the calculated results of high pass filter (not shown) of the digital image processing portion (DSP portion 5) are normalized by the average luminance of the image.

Here, the explanation about sharpness will be given. The sharpness indicates a level whether an image photographed by a CCD is a complicated image or not; in particularly, a digital arithmetic processing is carried out on a photographed image data, obtaining the frequency characteristic, and then when a high-frequency component is large, the sharpness is considered to be high.

A specific method of digital arithmetic includes the following method.

A CCD samples a two-dimensional plane at the position of the each pixel. The scale of the frequency component is obtained by summing adjacent data which are sampled the two dimensional plane. This is so called a digital filtering processing.

As the notice of the digital filtering processing, since the pixel data are used, the calculated result of the digital filter is varied by the exposure amount. If the calculated result is normalized by the brightness of subject, the image with the pure frequency component can be obtained without depending on the exposure amount.

Each frequency component can also be obtained by the known DCT (discrete cosine transform) method.

The sharpness is changed even when the subject is the same. That is, even though the same subject is used, if the subject is imaged as a still image on a CCD, the contour of each portion is clear, increasing the sharpness, and if the subject is imaged as a moving image, the sharpness is decreased.

Next, the explanation of FIG. 6A will be given.

Even though an exposure time is varied, following is true.

With An=Bn, if the sharpness of the image is not changed, it indicates the image is substantially stopped. An>Bn is a rare case in which a longer exposure time has higher sharpness than a shorter exposure time, and it is substantially An=Bn and considered that the sharpness of An is a little larger with a slight difference, indicating that the image is substantially stopped.

When a subject is moving, the sharpness is decreased; moreover, the sharpness of An with a longer exposure time is further decreased than Bn. That is, An<Bn indicates that the photographed image is moving.

At this point, Bn and Bn+1, which have the same exposure time are compared. With Bn=Bn+1, it can be assumed that the photographed image is regularly moving. Moreover, considering that a scene movement is not included, it has a higher possibility of handshake.

If these comparisons are performed for each image area, more accurate determination can be achieved. In case of handshake, un-blurred picture can be taken by using handshake seconds.

Meanwhile, if Bn and Bn+1 are not equal (shown as an inequality sign in FIG. 6A), it has a high possibility that a subject is moving, even though it is photographed by the handshake seconds, there is no guarantee that the blur is prevented.

In FIG. 6B, n and n+1 periods of the exposure periods A, B are compared, respectively and the differences by the time in a screen are observed.

If the exposure time of the exposure period B is adopted as a handshake preventing exposure time which is obtained from a focal length of a photographic lens, in accordance with FIG. 6B, when camera shake is determined, the blur is treated as handshake in the most of the cases, and when taking a still image, the image can be captured by the handshake preventing exposure time.

First of all, the relationship between an exposure time and a focal length will be described.

Handshake is largely concerned with a focal length of a photographic lens. A longer focal length of a lens for a telescopic lens increases the blur amount on a film surface even the same amount of the handshake.

Generally, if an exposure time is about 1/focal length of lens with an experience value of a camera with a 35 mm silver salt film, it is said that subject blur by the handshake while photographing and exposing is prevented even when handheld photographing is carried out. For a lens with a focal length of 50 mm, for example, if the exposure time is shorter than the 20 ms exposure time of 1/50, the handshake is not a problem.

On the other hand, for a 105 mm lens, if the exposure time is longer than 9.5 ms, the blurred picture by handshake is increased.

For a digital camera, a CCD size is converted into a film size, and it can be a measure for the above handshake preventing seconds.

Next, the explanation about FIG. 6B will be given.

In FIG. 6B, n period and n+1 period of the exposure periods A, B are respectively compared, and the differences by the time in a screen are observed.

If An and An+1, which include a time difference, have the same sharpness, it is assumed that a photographic image is almost not blurred.

If the sharpness of An and An+1 has difference, it shows that the photographic image is blurred; if the difference is small in Bn and Bn+1 exposed by the handshake preventing seconds, it is considered that the blur amount is controlled within the handshake preventing seconds, and the blur is considered as a camera shake (handshake).

If the difference in the sharpness of Bn and Bn+1 is large, it is determined as subject blur.

It is also possible to warn only camera shake even when blur is determined.

This is because, if the warning of camera shake such as handshake is given to an operator (photographer), the blur can be prevented in many cases; however, the warning of subject blur while photographing a moving image does not make sense in many cases.

The camera shake in FIGS. 6A and 6B, at the same time, detects that a subject hardly moves. Such photographing is a still life photographing including general person photographing, a sharp picture can be taken by flashing a strobe in accordance with shortening the exposure time.

When a subject is blurred, however, the stroboscopic flash is not appropriate to a photographic scene, and also the subject distance may be changed, so that a strobe control system for determining the amount of stroboscopic flash from a distance may not obtain appropriate exposure.

As described above, when a subject is blurred, it is determined that a moving image is photographed, and it is effective to shorten the exposure time with the minimum flush of the strobe and by increasing the gain of the picture signal.

With the system for determining the camera shake and the subject blur by a plurality of imaging data in which the above exposure time is changed, as shown in FIG. 5, a display rate is constantly maintained by displaying the only image in the A period and not displaying the image in the B period, and an awkward image during monitoring can be prevented.

(6) Explanation of Reproducing Main Processing

Figure 7A:
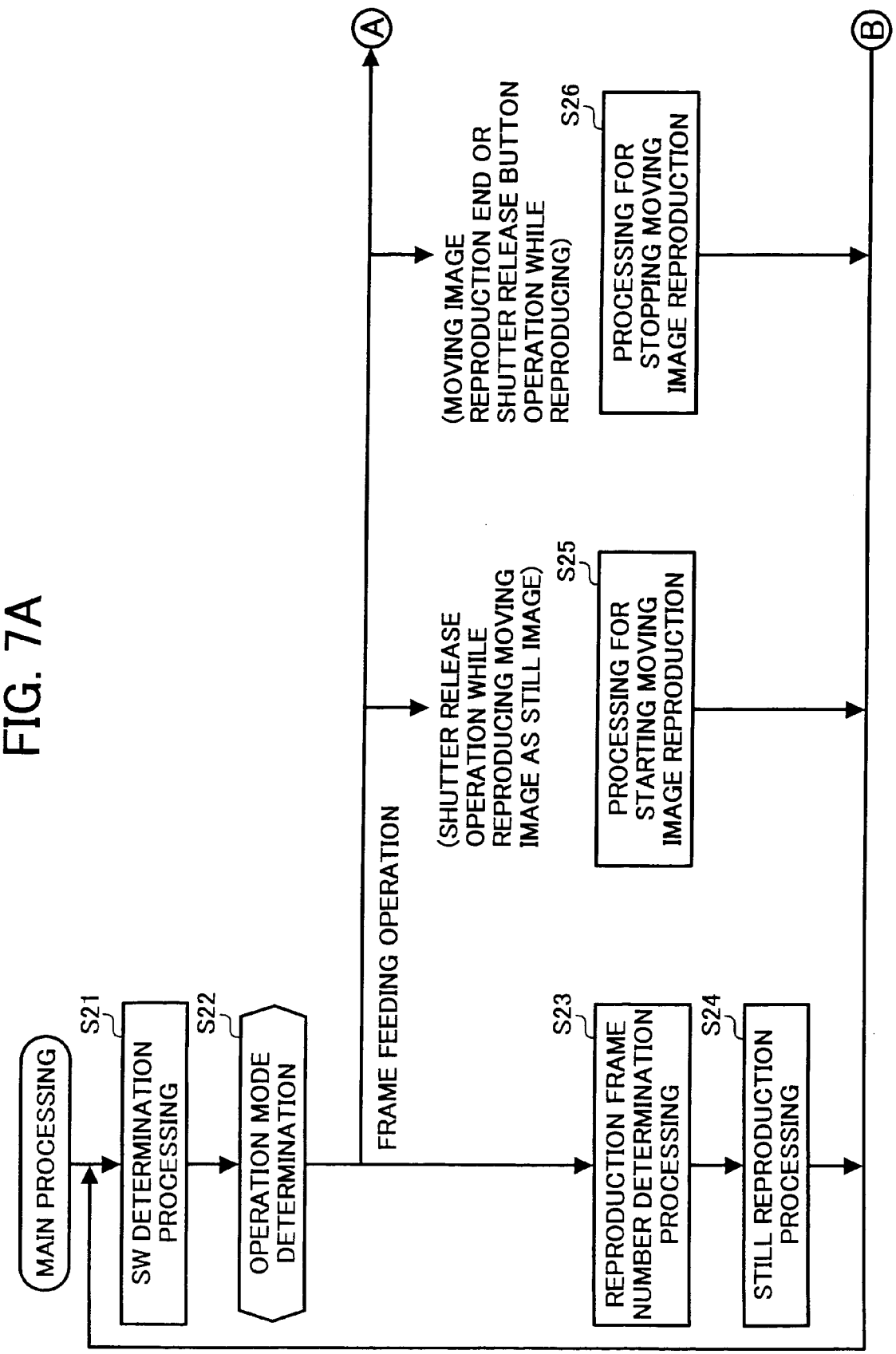

FIG. 7 is a flow chart of the main processing while reproducing.

The main processing portion constantly loops, and confirms the SW information operated by a user in a SW (switch) determination processing (step S21), sending the information to an operation mode determination portion (step S22).

The SW determination portion (step S21) confirms the SW information which is input by an interruption processing of a constant timer for 20 ms.

The operation mode determination portion (step S22) sorts the tasks into each processing by the confirmed SW information as shown in the processing flow chart of FIG. 7.

In case of a frame feeding operation, a frame number to be reproduced is determined (step S23) by a reproduction frame number determination processing, and the frame is displayed as the reproduced still image (step S24).

If a frame file is a still image or a still image including voice by a voice memo mode, the image is reproduced.

In case of a moving image, the image of the first one frame is reproduced, and becomes a still image state.

In case of voice, for example, the existing blue screen display is reproduced.

After the completion of the still reproduction, the processing returns to the SW determination processing again, and when there is not effective SW activation, the processing returns to the SW determination processing again (step S21) without doing any operation in the operation mode determination.

If the shutter release button is operated while the frame of moving image is reproduced as a still image, a processing for starting moving image reproduction is performed (step S25). This processing only activates the moving image reproduction processing of the parallel processing block 30 in FIG. 2; after that the main processing returns again to the loop for repeating the SW determination processing.

As described above, the main processing portion only controls the beginning and the end of each processing in the parallel processing block 30, and the parallel processing block, which operates collaterally with the main processing portion carries out the actual processing.

If the shutter release button is turned on while reproducing the moving image, a processing for stopping moving image reproduction is conducted in the main processing (step S26); the moving image reproduction processing of the parallel processing block 30 is thereby stopped, and a still state displaying the frame which is reproduced at that time is obtained.

Regarding the voice reproduction, as well as the above moving image, the main processing controls the beginning and the end of the voice reproduction processing in the parallel processing block (steps S27, S28).

In case of a receiving recording operation (for example, receiving from the second external device 15 in FIG. 1), after the communication processing is carried out through the communication driver portion 10 (step S29), the data is recorded in the memory card 11 (step S30), and an update processing of information related a frame is carried out (step S31).

(6-1) Explanation of Moving Image Reproduction

The moving image reproduction processing will be described based on FIG. 1.

The CPU portion 8 loads the moving image and voice data, which are packaged for one second from the memory card 11, into the memory 9.

If a moving image format is Motion Jpeg of 15 frames/second, for example, the moving image data are 15 JPEG data.

The voice data are voice digital data for one second, for example, if the data is sampled and recorded by 16 bit of 8 KHz period without compression, the data is the continued data of 16K byte.

The DSP portion 5 expands the JEPG data of the memory 9 one by one with the same rate of the recording flame rate and stores the expanded data into the display memory area of the memory 9.

The DSP portion 5 displays the display memory area in the memory 9 on the displaying portion 12.

The DSP portion 5 sends the voice data in the memory 9 to the voice CODEC 16 with the same rate of the recording voice rate, and outputs the data as analogue data.

(6-2) Explanation of Voice Reproduction

In case of the voice reproduction processing, the CPU portion 8 sequentially loads the voice data from the memory cards 11 into the memory 9. The DSP portion 5 sends the voice data in the memory 9 to the CODEC with the same rate of the recording voice rate, and outputs the data as analogue data.

As described above, according to the present invention, the type of blur, camera shake or subject blur, can be determined, so that when a still image is captured, the most suitable exposure condition can be set in accordance with the camera shake or the subject blur.

Only when handshake is detected, it is possible to take a picture while the prevention exposure time which is output by the handshake prevention exposure time output device, enabling to capture a still image without handshake.

Moreover, a user (photographer) who receives the warning pays attention to the camera shake (handshake), so that the possibility of the camera shake is decreased.

Only when the handshake is detected, the exposure time is shortened, and if the exposure is not enough, the strobe is flashed, enabling to capture a still image without handshake.

Furthermore, when a moving image with subject blur is captured, a still image without blur can be taken by increasing sensitivity.

Even though a picture with a different exposure time is taken, the image display to the display device is constant, so that the image can be displayed smoothly.

Those skilled in the art will reorganize that many modifications to the embodiment described above are possible within the scope of the invention, which is defined in the appended claims.

What is claimed is:

1. A digital camera having an image forming device configured to image a subject by a setup exposure condition and a digital image processing device configured to convert imaging data from the image forming device into a digital image, the digital camera comprising:

a setup device configured to set up a plurality of exposure conditions, an imaging data obtaining device configured to obtain a plurality of imaging data imaged in accordance with the plurality of exposure conditions set by the setup device, and a sharpness comparison device configured to compare sharpness based on the plurality of imaging data obtained by the imaging data obtaining device, and to determine whether a difference in sharpness corresponding to different exposure times of the plurality of imaging data indicates one of a shake of the digital camera, a movement of the subject, and absence of a blur based on the compared sharpness, wherein the sharpness comparison device compares a sharpness value corresponding to a first time period having a first exposure time with a sharpness value corresponding to a second time period having a second exposure time, and if the sharpness value for the first exposure time is greater than or equal to the sharpness value for the second exposure time, then it is determined that a blur has not occurred, and if the sharpness value for the first exposure time is less than the sharpness value for the second exposure time, then it is determined that a blur has occurred.

2. The digital camera according to claim 1, further comprising:

a handshake preventing exposure time output device configured to output an exposure time for preventing a blur in an image caused by the shake of the digital camera based on a focal length of a photographic lens in the image forming device, wherein an existence of the camera shake is determined based on the exposure time output by the handshake preventing exposure time output device.

3. The digital camera according to claim 2, further comprising:

a warning device configured to warn of the shake of the digital camera when the existence of the shake of the digital camera is determined.

4. The digital camera according to claim 2, wherein when the existence of the shake of the digital camera is determined, a predetermined exposure time while recording a still image is shortened, and a strobe is flashed in accordance with shortening the predetermined exposure time.

5. The digital camera according to claim 2, wherein when a movement of the subject is determined to exist, a sensitivity for increasing the output of the imaging data while recording a still image is increased.

6. The digital camera according to claim 1, further comprising:

a display device configured to display an image processed by the digital image processing device, wherein a display time to the display device is made constant regardless of an exposure time in the image forming device.

7. The digital camera according to claim 2, further comprising:

a display device configured to display an image processed by the digital image processing device, wherein a display time to the display device is made constant regardless of an exposure time in the image forming device.

8. The digital camera according to claim 3, further comprising:

a display device configured to display an image processed by the digital image processing device, wherein a display time to the display device is made constant regardless of an exposure time in the image forming device.

9. The digital camera according to claim 4, further comprising:

a display device configured to display an image processed by the digital image processing device, wherein a display time to the display device is made constant regardless of an exposure time in the image forming device.

10. The digital camera according to claim 5, further comprising:

a display device configured to display an image processed by the digital image processing device, wherein a display time to the display device is made constant regardless of an exposure time in the image forming device.

11. The digital camera according to claim 1, wherein when the sharpness comparison device determines that a blur has occurred, a second comparison is made between the sharpness value corresponding to the time period having the second exposure time and a sharpness value corresponding to a second time period having the second exposure time, and if the result of the second comparison is that the sharpness values are equal then it is determined that a shake of the digital camera has occurred, and if the result of the second comparison is that the sharpness values are not equal then it is determined that a movement of the subject has occurred.

12. A digital camera having an image forming device configured to image a subject by a setup exposure condition and a digital image processing device configured to convert imaging data from the image forming device into a digital image, the digital camera comprising:

a setup device configured to set up a plurality of exposure conditions, an imaging data obtaining device configured to obtain a plurality of imaging data imaged in accordance with the plurality of exposure conditions set by the setup device, and a sharpness comparison device configured to compare sharpness based on the plurality of imaging data obtained by the imaging data obtaining device, and to determine whether a difference in sharpness corresponding to different exposure times of the plurality of imaging data indicates one of a shake of the digital camera, a movement of the subject, and absence of a blur based on the compared sharpness, wherein the sharpness comparison device compares a sharpness value corresponding to a first time period having a first exposure time with a sharpness value corresponding to a second time period having the first exposure time, and if the sharpness value for the first time period having the first exposure time and the sharpness value for the second time period having the first exposure time is the same then it is determined that a blur has not occurred.

13. A digital camera having an image forming device configured to image a subject by a setup exposure condition and a digital image processing device configured to convert imaging data from the image forming device into a digital image, the digital camera comprising:

a setup device configured to set up a plurality of exposure conditions, an imaging data obtaining device configured to obtain a plurality of imaging data imaged in accordance with the plurality of exposure conditions set by the setup device, and a sharpness comparison device configured to compare sharpness based on the plurality of imaging data obtained by the imaging data obtaining device, and to determine whether a difference in sharpness corresponding to different exposure times of the plurality of imaging data indicates one of a shake of the digital camera, a movement of the subject, and absence of a blur based on the compared sharpness, wherein the sharpness comparison device compares a sharpness value corresponding to a first time period having a first exposure time with a sharpness value corresponding to a second time period having the first exposure time, and if the sharpness value for the first time period having the first exposure time and the sharpness value for the second time period having the first exposure time is the same then it is determined that a blur has not occurred, and wherein when the sharpness comparison device determines that there is a difference between the sharpness value for the first time period having the first exposure time and the sharpness value for the second time period having the first exposure time, then a second comparison is made between a sharpness value corresponding to a first time period having a second exposure time and a sharpness value corresponding to a second time period having the second exposure time, and based on the result of the second comparison it is determined whether a difference in the sharpness values indicates one of a shake of the digital camera and a movement of the subject.

* * * * *